United States Patent [19]

Leggett

[11] Patent Number: 4,970,055
[45] Date of Patent: Nov. 13, 1990

[54] CARBON GENERATOR

[76] Inventor: Harold E. Leggett, 1432 Marlene Dr., DeSota, Tex. 75115

[21] Appl. No.: 326,321

[22] Filed: Mar. 21, 1989

Related U.S. Application Data

[63] Continuation of Ser. No. 12,000, Feb. 6, 1987, abandoned.

[51] Int. Cl.$^5$ .......................... B01J 12/02; C09C 1/00
[52] U.S. Cl. ..................................... 422/154; 422/210
[58] Field of Search ............... 422/154, 153, 152, 210, 422/109–111, 310; 423/452

[56] References Cited

U.S. PATENT DOCUMENTS

| | | | |
|---|---|---|---|
| 1,111,009 | 9/1914 | Davis | 422/154 |
| 1,367,178 | 2/1921 | Bubb | 422/154 |
| 3,051,554 | 12/1959 | Butts et al. | 422/154 |

FOREIGN PATENT DOCUMENTS 13323  7/1988  United Kingdom ................. 422/210

Primary Examiner—Joye L. Woodard
Attorney, Agent, or Firm—Richards, Medlock & Andrews

[57] ABSTRACT

An apparatus and method for recovering carbon from a carbon-containing gas are provided. The apparatus comprises a burner assembly adapted to deposit carbon from the carbon-containing gas on the interior surface of a rotatable cylinder that is disposed in either a horizontal or inclined relation to a supporting surface. A device is provided for removing the deposited carbon from the interior surface of the rotatable cylinder, whereby the carbon deposited on the cylinder is recovered. Louvers having a series of baffles are mounted over the ends of the cylinder for regulating air flow into and flue gas flow from the cylinder, and elongate shafts having louvers therein are mounted to the ends of the cylinder for dissipating heat generated during operation by free or forced convection of air through the shaft louvers.

7 Claims, 8 Drawing Sheets

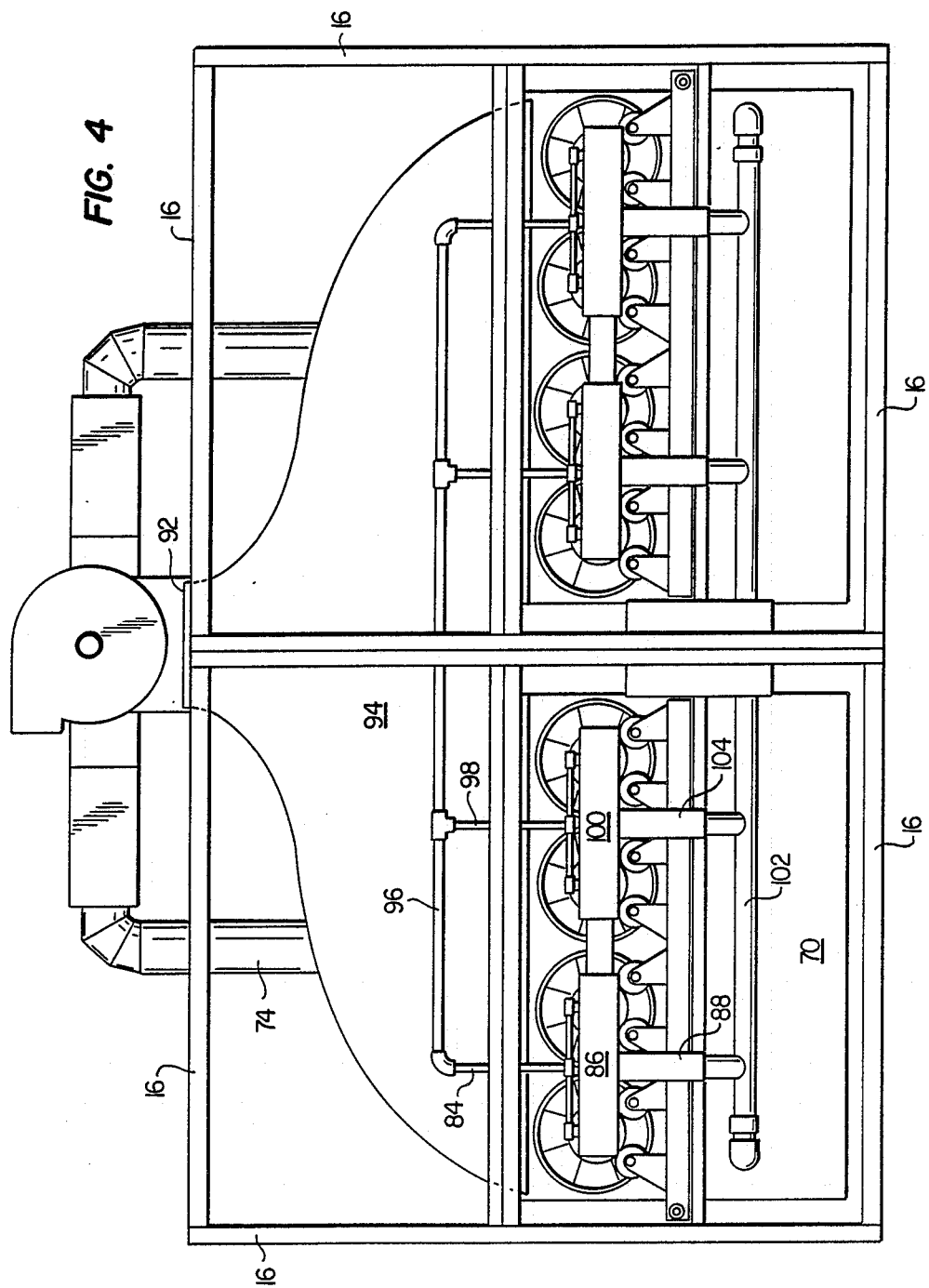

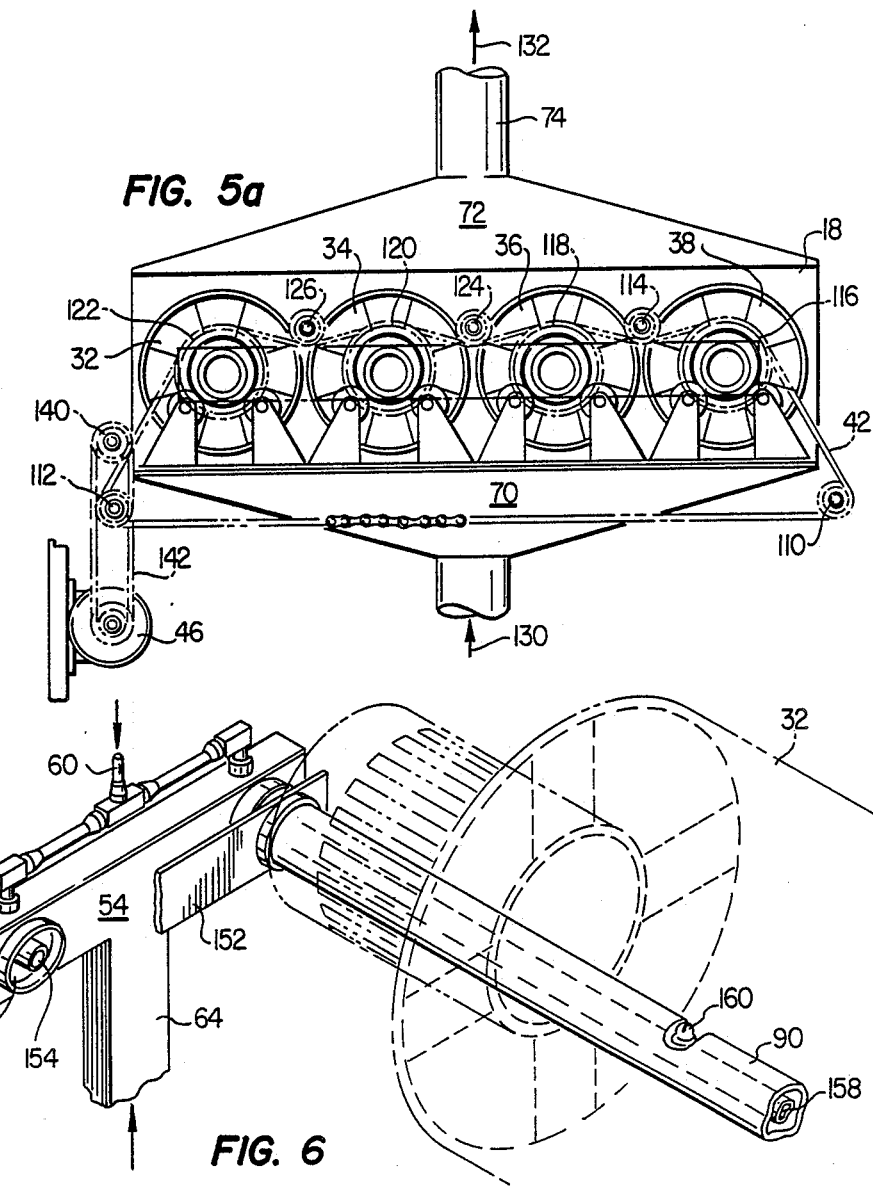

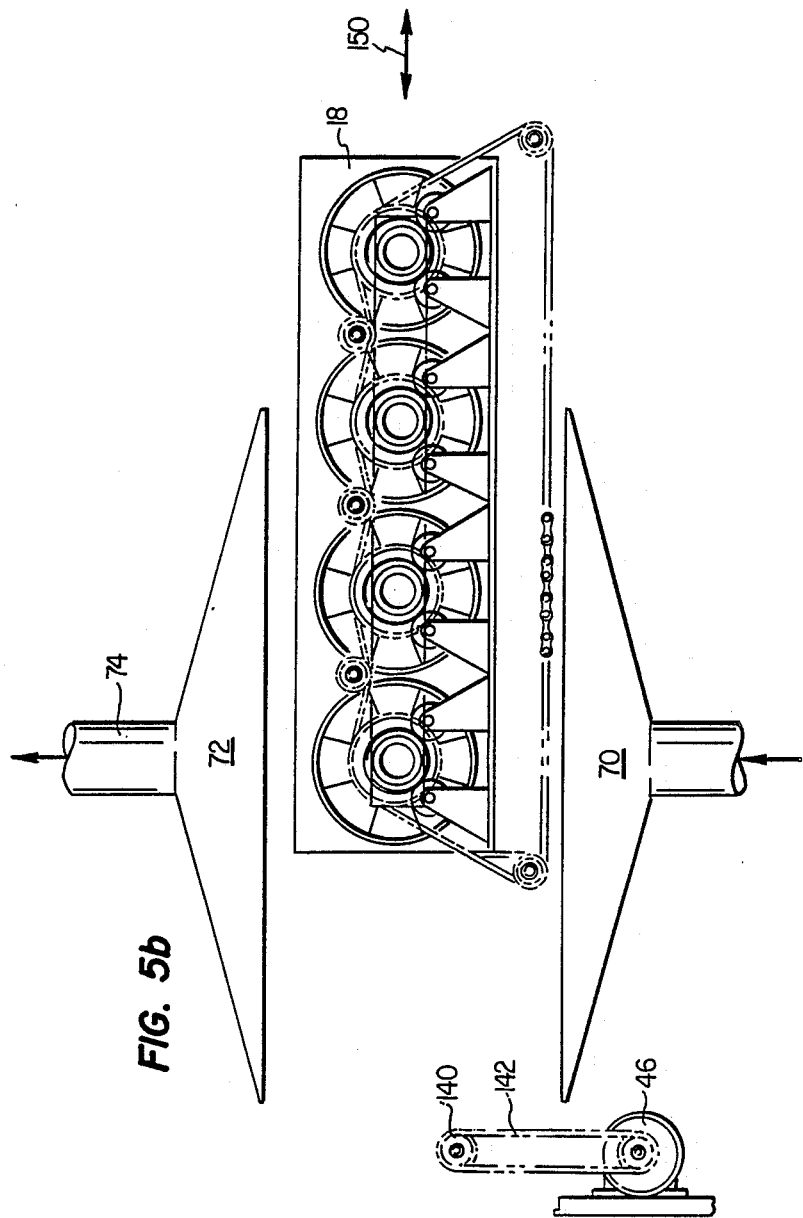

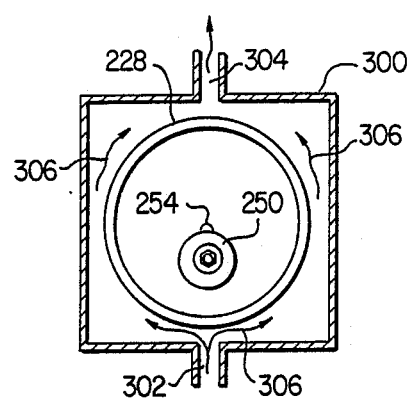
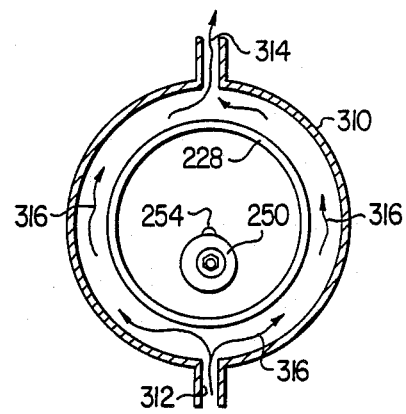
FIG. 7a          FIG. 7b
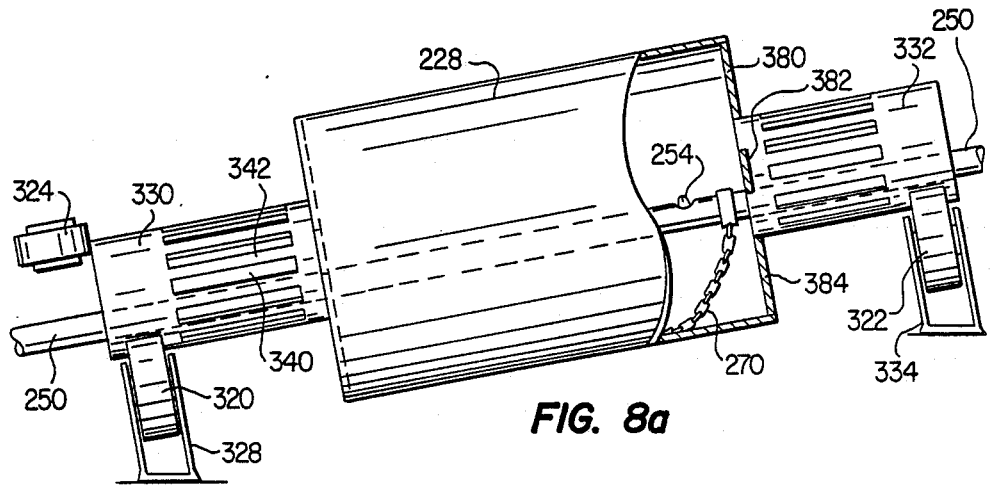
FIG. 8a
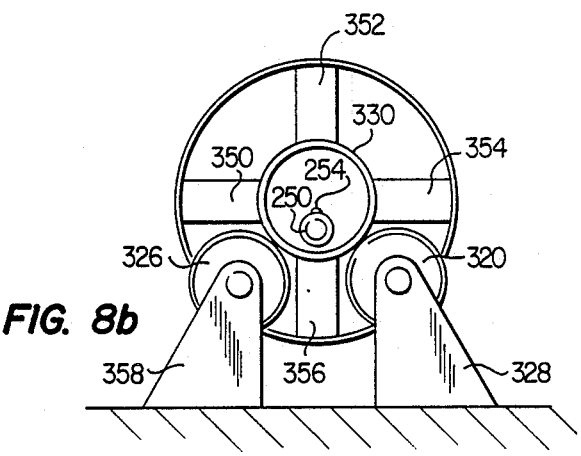
FIG. 8b

CARBON GENERATOR

This is a continuation of application Ser. No. 012,000 filed Feb. 6, 1987, now abandoned.

TECHNICAL FIELD

This invention relates to apparatus that are useful for producing carbon black. One aspect of the invention relates to an apparatus for producing carbon black that is skid-mounted and easily transportable. Another aspect of the invention relates to an apparatus for reclaiming carbon from the off-gases produced from oil or gas wells, refinery gases, and the like. A further aspect of the invention relates to apparatus adapted to deposit carbon black on a temperature-controlled rotating cylinder and thereafter recover the carbon black. Yet another aspect of the invention relates to a method for recovering significantly improved yields of carbon black from a gaseous hydrocarbon through use of the apparatus of the invention. Still another aspect of the invention relates to a novel apparatus and method for producing impingement black on the interior surface of a rotatable, temperature-controlled cylinder and thereafter recovering the carbon black by gravity flow.

BACKGROUND ART

Carbonaceous gases such as those disclosed above can be naturally occurring, or can be produced as a byproduct from any of a wide range of industrial processes. Such gases typically comprise various light-end hydrocarbons such as, for example, ethane, methane, ethylene, propane and/or butane in various combinations, depending upon the particular source. In situations where the quantities or compositions of the gas are not sufficient to justify the use of gas-recovery techniques, such gases have in past times either been released to the atmosphere or flared. Releasing these gases to the atmosphere is undesirable because of the dangerously explosive accumulations or pockets that may result. Flaring reduces the risk of explosion, but may still result in undesirably high levels of pollutants, particularly particulate emissions, being released to the atmosphere. Furthermore, flaring carbonaceous gases results in the loss and waste of the carbon which they contain, and is illegal in most jurisdictions.

Generally speaking, the term "carbon black" includes any of various finely divided forms of carbon made by the incomplete combustion or thermal decomposition of a carbonaceous fuel. The principal types of carbon black, classified according to the method of production, are impingement black (also frequently referred to as channel black), furnace black and thermal black. Impingement black is generally characterized by a lower pH, higher volatile content and less chainlike structure between the particles. Impingement black has the smallest particle size and largest specific surface area of any industrial material. Particles of impingement black are typically in the colloidal range, with surface areas running to about 18 acres per pound. High quality impingement blacks are sometimes referred to as "special blacks." The uses for special blacks recovered from gaseous hydrocarbons are numerous. Such blacks are used, for example, in the manufacture of inks, plastics, pigments, wire insulation, photocopying, and the like.

Methods and apparatus for producing impingement black from carbonaceous gases have previously been disclosed, for example, in U.S. Pat. Nos. 2,427,509; 3,051,554; and 3,987,019. The previously disclosed methods and apparatus for producing impingement black have utilized the exterior surfaces of channels, discs or drums as the impingement surfaces. Burners disposed near the impingement surfaces are fueled with a carbonaceous gas and an amount of oxygen which is sufficient to support combustion but insufficient for complete combustion of the carbon contained in the gas, thereby causing such carbon to be deposited as carbon black on the surface against which the flames from the burners impinge. According to conventional methods and apparatus, the carbon black is thereafter recovered when the impingement surface is withdrawn from the flames and scraped, causing the carbon black to fall from the surface into collection hoppers by gravity flow. However, numerous disadvantages have been encountered in using the devices previously disclosed.

With some of the devices, temperature control and the dissipation of heat have been a problem. If the impingement surface becomes excessively hot, the yield of carbon black deposited per given volume of gas will decrease. Moreover, undesirable expansion or warping of the impingement surface may occur. This is particularly true in apparatus utilizing metallic plates as the impingement surfaces.

Another disadvantage relates to the method and apparatus used to collect the carbon black deposited on the impingement surface. The scrapers and gravity-flow collection hoppers employed in the conventional devices require that the impingement surface be disposed above and closely adjacent to the collection hopper, a limitation that may be inconvenient or unworkable for some applications.

A further disadvantage relates to the fact that apparatus conventionally employed for the production of impingement black have not been adapted for ease of transportability, installation and subsequent relocation to another use site. The provision of an efficient mobile carbon generator would greatly facilitate the recovery of carbon on a cost effective basis from sources of carbonaceous gases that were previously considered to be either too small or too remote to warrant such treatment.

The prior art suffers the further disadvantages of failing to provide means for regulating the operational temperature of the carbon black generating surface, and fails to provide or suggest means for regulating the inlet air or outlet flue gases through a carbon black generating cylinder. Further, the prior art fails to provide or suggest a means for assuring efficient uniform production of the desired size carbon black material when ambient conditions, such as relative humidity and atmospheric pressure, change during operation.

Most importantly, the prior art fails to teach or suggest means of rotatably mounting a carbon black generating cylinder on bearing surfaces, whereby the bearing surfaces are thermally insulated from the hot working area of the rotating cylinder.

SUMMARY OF THE INVENTION

According to the present invention, an apparatus is provided that will for the first time permit carbon black to be efficiently and economically recovered from relatively small streams of carbonaceous gases.

According to a preferred embodiment of the invention, an apparatus for producing carbon black by an impingement process is provided which is skid-mounted, which can be employed adjacent to and in combination with as many additional similar units as may be required for a particular application, yet which can be independently serviced and maintained without removing any of such adjacent units from service or operation.

According to another embodiment of the invention, an apparatus for producing carbon black by impingement heating is provided that comprises at least one rotatable, cylindrical impingement heating surface in combination with a system for recovering impingement black from that surface.

According to another embodiment of the invention, an apparatus is provided which comprises a plurality of parallel and spaced-apart, rotatable, cylindrical impingement surfaces, each of which is fired by a single row of burners disposed therein.

According to another embodiment of the invention, an apparatus for producing carbon black by impingement heating is provided which comprises an inclined rotatable cylinder in combination with means for depositing carbon black on the interior surface of that cylinder.

According to yet another embodiment of the invention, methods and processes are provided for utilizing the subject apparatus in the efficient and economical production of impingement black.

The present invention further provides for an improved means of keeping the carbon generating cylinder surface at a relatively constant preselected temperature to assure uniform distribution and production of carbon black particles of the desired size during use. Further, according to yet another embodiment of the present invention an improved means for rotatably mounting the cylinder on bearings is provided whereby the heat generated during carbon black production is removed from the cylinder proximate the bearing surfaces to avoid overheating of the bearings. In another aspect, the present invention provides a means for regulating the flow of feed air into the cylinder and to regulate the flow of flue gases therefrom, thereby regulating the temperature conditions in the cylinder and also avoiding disruption of the burner flames due to high air velocities through the cylinder.

Further, the present invention provides a means whereby the burners' flames may be raised or lowered with regard to the interior surface of the rotating cylinder to assure the efficient production of uniform carbon black particles of the desired size as the ambient atmospheric pressure and/or humidity varies during use. Further, the present invention provides a means whereby the combustion of carbon containing gas occurs at a constant pressure, regardless of fluctuations of the ambient pressure outside of the carbon black generating device due to changes in barometric pressure associated with changes in the weather. Further, the present invention contemplates a control system linked to a means to control the pressure at which combustion takes place, and to control the distance between the burner flames and the interior surface of the rotatable cylinder so that a uniform carbon black product may be produced regardless of fluctuations in the exterior barometric pressure, and humidity due to changes in the weather, and due to fluctuations in the BTU content of the carbon-containing gas, which fluctuations may occur during a carbon generating run.

BRIEF DESCRIPTION OF THE DRAWINGS

The present invention will be better understood upon reading the detailed description set forth below in connection with the following drawings wherein:

FIG. 4 is a side view of the present invention with its side covers removed;

FIG. 5a is an end view of one aspect of the present invention;

FIG. 5b is an end view of one aspect of the present invention;

FIG. 6 is a perspective view of one aspect of the present invention;

FIG. 7a is a cross sectional view of one embodiment of the present invention;

FIG. 7b is a cross sectional view of one embodiment of the present invention;

FIG. 8a is a broken away view of one aspect of the present invention;

FIG. 8b is an end view of one aspect of the present invention;

DETAILED DESCRIPTION

Figure 1:
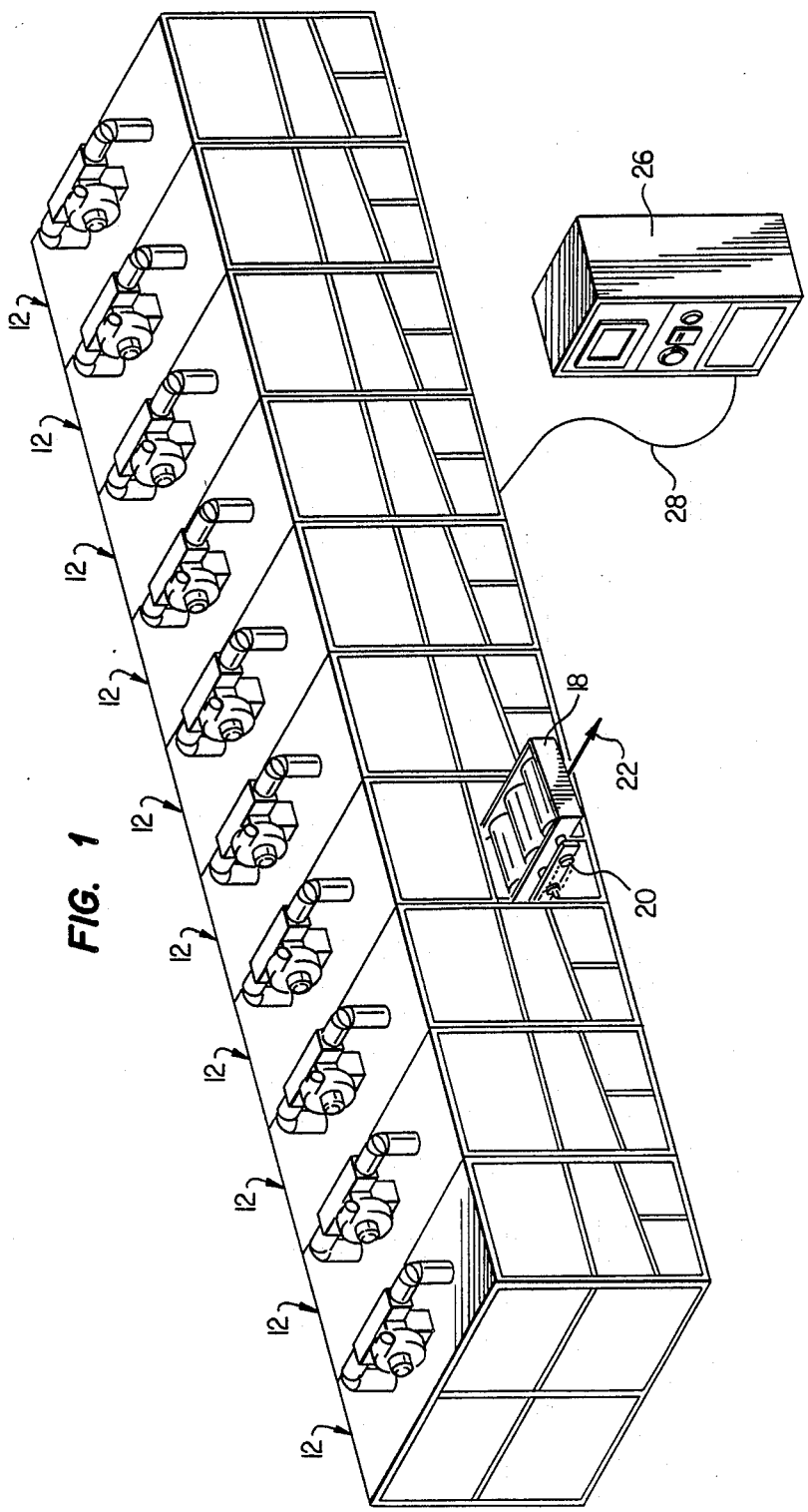
FIG. 1 is a perspective view depicting a mobile skid having mounted thereon a plurality of mobile carbon generators made in accordance with the apparatus of the invention.

Referring to FIG. 1, the carbon black recovery apparatus of the invention preferably comprises at least one carbon black recovery unit 12 adapted to recover carbon black from carbonaceous gases by an impingement process as set forth below. According to a preferred embodiment of the invention, the carbon black recovery apparatus further comprises a plurality of substantially self-contained carbon black recovery units 12 disposed in parallel, side-by-side relation to each other. Although not shown in FIG. 1, it will be understood that a plurality of carbon black recovery units 12 can be combined within a single cabinet or enclosure within the scope of the invention, and in some cases, certain economies of scale may be realized by consolidating the inlet air, cooling air, vacuum or flue gas assemblies.

As shown in FIG. 1, carbon black recovery apparatus comprises ten carbon black recovery units 12 that may be skid-mounted on rails (not shown) in adjacent, side-by-side relation to each other. Although carbon black recovery units 12 are depicted as being adjacent in FIG. 1 for ease of illustration, it will be understood and appreciated by those of ordinary skill in the art upon reading the present disclosure that carbon black recovery units 12 can also be disposed in substantially parallel and spaced apart side-by-side relation on rails within the scope of the invention to facilitate installation, maintenance and removal of individual units 12 without interrupting the cycle of operation of those units. The number of carbon black recovery units 12 desirable for use in a particular carbon black recovery apparatus will vary according to the availability of carbonaceous gas at the use site and the design throughput of each carbon black recovery unit 12. In some instances it may be preferable to bolt, weld or otherwise connect each carbon black recovery unit 12 to its own set of rails, which can then be interconnected with other carbon black recovery units 12 to form a unitary carbon black recovery apparatus comprising a plurality of carbon black recovery units 12. On the other hand, the units may be mounted on a trailer for ease of transport. When carbon black recovery apparatus is designed and constructed in the manner disclosed herein, the production capacity and capital investment dedicated to a particular use site can be quickly and economically adjusted, depending upon the availability of carbonaceous gas at a particular time.

Thus, at some point during drilling or production operations for a gas or oil well, it may be desirable to have a carbon black recovery apparatus on site to recover carbon black from the light-end hydrocarbons produced. If, during the course of drilling or production, the volume of carbonaceous waste gas subsequently increases significantly, additional carbon black recovery units 12 can be quickly installed to avoid having to flare, vent, or otherwise dispose of the excess gas. Conversely, if during the course of operations it is determined that the volume or composition of the gas is insufficient to justify further recovery operations, one or more of the carbon black recovery units 12 of carbon black recovery apparatus can be relocated to a more productive job site. Because of the more efficient utilization of the apparatus that is thus permitted, the capital investment for the equipment can be more quickly recovered, thereby improving profitability.

Moreover, because of the compact arrangement and convenient access provided by the apparatus of the invention, other savings of time and expense will also be observed through its use.

According to a preferred embodiment of the invention, each carbon black recovery unit 12 preferably further comprises a cabinet assembly, cylinder assembly 18, cylinder drive assembly 20, a burner assembly, a cooling assembly, and a flue gas assembly. As shown in FIG. 1, cylinder assembly 18 is mounted in a drawer like fashion so that it is slidably removable from the cabinet assembly of each carbon black recovery unit 12, as shown by arrow 22. Further, the carbon black recovery apparatus is connected to a control unit 26 by electrical line 28, where line 28 attaches to at least one of the carbon black recovery units 12, or there may be one similar line running from control unit 26 to each of the recovery units as needed. It will be understood that a single line 28 may be used to control a plurality of recovery units 12 when a plurality of units are used in a connected fashion as shown in FIG. 1.

Control unit 26 is used to control the internal pressure in each carbon black recovery unit 12, the rate at which hydrocarbon gas is combusted to form a carbon black product, and the temperature at which the carbon black product impinges upon the interior surface of the cylinders employed in each carbon black recovery unit 12. It will be further understood that control unit 26 may further employ meters for monitoring the local atmospheric pressure, relative humidity, and air temperature so that the internal combustion conditions in each carbon black recovery unit may be monitored and altered as necessary to assure that the carbon black product is produced in a uniform manner as the local atmospheric pressure, relative humidity, and air temperature change during use.

It will be further understood that such changes in the combustion conditions may be made manually by an operator directly observing the changes in local atmospheric pressure, relative humidity, and air temperature, or that a computer may be employed in control unit 26 to monitor these functions and appropriately adjust the internal combustion conditions to assure the uniform production of the desired carbon black product. The present invention contemplates that the internal combustion conditions in each carbon black recovery unit may be altered by increasing or decreasing the internal barometric pressure of the recovery unit, and/or changing the distance between the hydrocarbon gas burner and the carbon black impinging surface. It is principally to these means that the carbon black product is maintained in a uniform quality, even if the local weather conditions change during operation.

Figure 2:
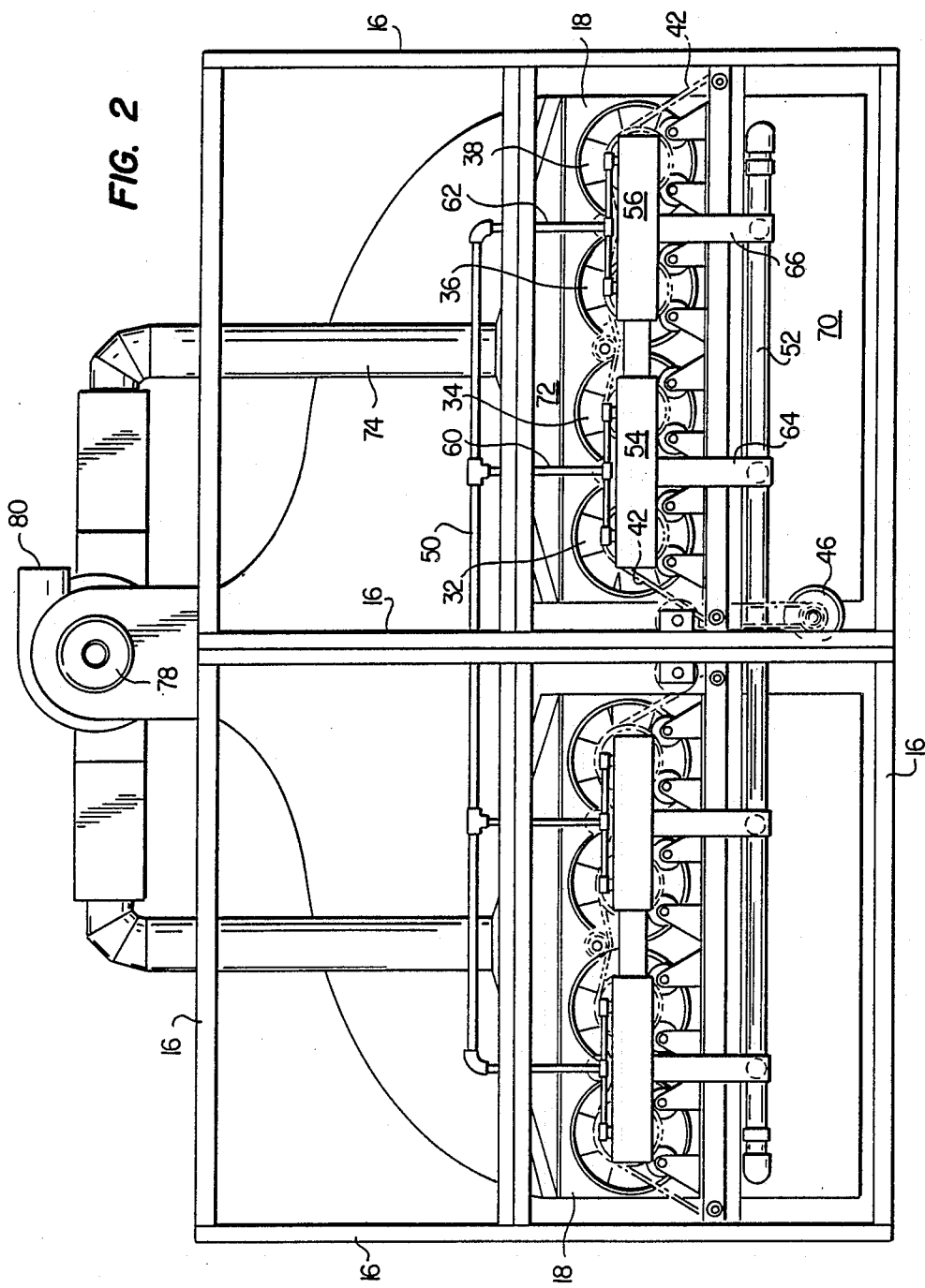
FIG. 2 is a side elevation of the apparatus of the present invention with its side covers removed.

Referring now to FIG. 2, a side view of a carbon black recovery unit 12 is shown with its outside covers removed. In particular, a carbon black recovery unit 12 comprises a main frame 16 made of a plurality of structural support members which serve the dual purpose of providing mechanical support for the internal components of the carbon black recovery unit 12, and provide a rectangular box which may be closed, having its interior isolated from the atmosphere by placing metal or plastic covers over each of the four sides, top, and bottom of the recovery unit to make an airtight vessel. (These side covers are not shown, but may be made of any suitable material so as to isolate the interior of the recovery unit 12). It will be obvious to one of ordinary skill in the art that while the recovery unit 12 has outside covers on its four sides, bottom and top, that these covers will have suitable apertures through which pipes or other vessels containing the hydrocarbon gas and oxygen containing air to be combusted may pass, through which the combustion products or exhaust gases may pass in a suitable vessel, and through which cooling air may both enter and exit the recovery unit 12 through suitable vessels.

In general, recovery unit 12 has two banks of cylinders, being cylinder assemblies 18, each cylinder assembly having four cylinders 32, 34, 36 and 38, respectively. Each assembly of cylinders is in turn driven in rotation by a cylinder drive mechanism comprising chain 42, which chain is driven by a motor unit 46. It will be understood that chain driving motor unit 46 may be either electric or hydraulically driven, and that in the preferred embodiment motor unit 46 is hydraulically driven. It will be understood by one ordinarily skilled in the art that it is advantageous to use a hydraulic motor unit to avoid the danger of explosion associated with an electric motor in the presence of combustible hydrocarbon gases.

Hence, motor unit 46 may be hydraulically driven by a remote hydraulic pump coupled with motor unit 46 by hydraulic lines (not shown), and, yet in further alternative embodiments, motor unit 46 may be driven by compressed air or any other suitable means which would not cause an electric spark or open flame to occur within recovery unit 12. It will be further understood that motor unit 46 may be controlled by the user to run at various speeds so that the rate of rotation of carbon black impinging cylinders may be controlled within desired ranges.

Located in each of cylinders 32, 34, 36, and 38 is a gas burner assembly (not shown). Each gas burner is fed with a hydrocarbon gas by line 50 and supplied with air by line 52. The gas burner assemblies located in cylinders 32 and 34 are fed gas and air by plenum 54 which in turn is supplied gas by feed line 60 and by feed line 64. Similarly, the gas burners in cylinders 36 and 38 are supplied gas and air by plenum 56 which is fed gas by feed line 62 and fed air by feed line 66. Plenums 54 and 56 may be detached from the burner assemblies to allow maintenance to be performed, or to allow the impinging cylinders to be removed from the unit.

Cylinder assembly 18 comprises a structure which isolates the external surface of each of the carbon impinging cylinders from the interior of the recovery unit 12, and allows cooling air supplied by plenum 70 to pass from the bottom of recovery unit 12 across the exterior surfaces of each of the carbon black impinging cylinders and into plenum 72, where the cooling air is drawn from plenum 72 through duct 74, and whence the air is exhausted from the unit through exhaust 80. It will be understood that cooling air is supplied to plenum 70 by ducts open to the outside atmosphere (not shown), and that this cooling air is drawn across the external surface of each cylinder by the effect of blower 78.

It will be further understood that while an electric motor could be employed, in the preferred embodiment blower 78 is driven by a hydraulic motor to avoid the dangers associated with the use of an electrical motor. And yet further, it will be understood to one of ordinary skill in the art that the cooling air drawn across the external surface of each impinging cylinder will serve to regulate the temperature of each cylinder, and will be always isolated from the interior of the impinging cylinders, so that the presence of cooling air in plenums 70 and 72 will not alter the barometric pressure of the combustion air located with the impinging cylinders.

It is one purpose of the present invention to keep the cooling air separated from the air located on the inside of the carbon black recovery units, so that the barometric pressure of the internal air may be regulated to compensate for changes in the local weather conditions, thus ensuring the production of a uniform high quality carbon black product, without concern from the effects of changing pressures in the cooling air passing over the outside surfaces of each impinging cylinder.

Control unit 26 is used to control the speed of blower 78, thereby controlling the rate at which cool air passes over the external surface of each cylinder. It will be understood that the internal surface temperature of each cylinder may be controlled by either increasing or decreasing the rate at which cool air is drawn across the external surface of the particular cylinder, and may be controlled by either increasing or decreasing the rate of rotation of the cylinder. It will be further understood that by knowing the BTU content of a particular hydrocarbon gas, the combustion temperature of that gas, the temperature of the outside atmospheric air, the rate of cylinder rotation, and the rate at which the outside air is drawn across the external surface of the hot cylinder, the internal surface temperature of the cylinder may be controlled by varying the rate cooling air passes across the external surface of each cylinder.

Hence, it will be understood that the external temperature of each cylinder may be controlled by varying the speed blower 78 draws air through plenums 70 and 72, and through duct 74. Generally, the cooling air will serve to regulate the temperature of the impinging cylinders of from between about 200° F. to about 400° F. In particular, it has been discovered that superior carbon blacks are formed by the apparatus of the present invention when the impinging surfaces are maintained at a temperature of about 375° F. This aspect of the present invention allows certain carbon blacks which were heretofore difficultly produced to be produced in a good quantity, since certain carbon blacks are required to be produced on a relatively cool surface, as opposed to a surface having temperatures approaching the temperatures of the combustion gases.

Figure 3:
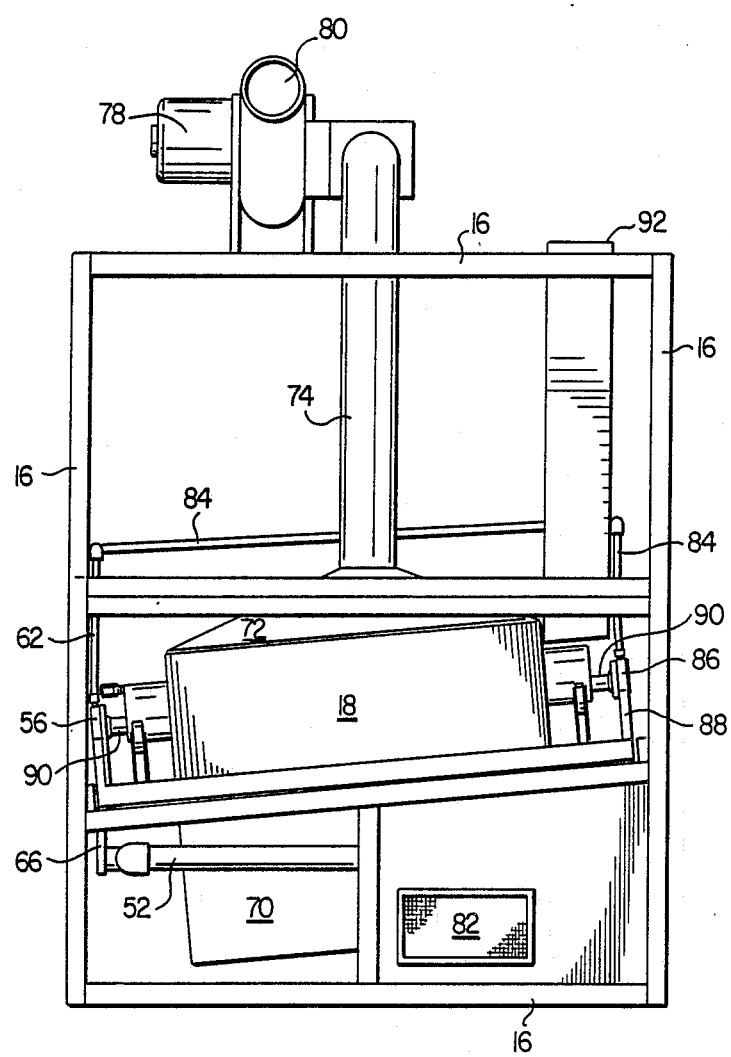
FIG. 3 is an end view of the apparatus of the present invention with its end covers removed.

Referring now to FIG. 3, a carbon black recovery unit 12 is shown in an end view with its cover plates removed from main frame 16. Plenum 70 is shown as attached to the base of cylinder assembly 18 and plenum 72 is shown attached to the top of cylinder assembly 18. Vent 82 is shown, which vent supplies plenum 70 with cool air from the exterior of recovery unit 12. Hydrocarbon gas supply line 84 is shown connected to feed line 62 and connected to gas supply line 84. Gas supply line 84 supplies plenum 86 with hydrocarbon gas to be combusted, and line 88 supplies manifold 86 with oxygen containing air to be used in combustion.

It will be understood that plenums 56 and 86 service the first and second ends of a combustion tube which runs between each plenum throughout the length of the rotating cylinder, and that combustion gases and oxygen containing air are fed into the combustion tube from both its first and second ends during the combustion process. As shown in FIG. 3, cylinder assembly 18 is disposed at an angle, and in the preferred embodiment, the angle of disposition is about 5°. However, it will be understood to one of ordinary skill in the art that the angle of disposition may be less than 5° and up to about 20° without disturbing the operation of the apparatus of the present invention. This slant of the cylinders within assembly 18 permits carbon black collected on the interior surface of each cylinder to migrate towards the low end of each cylinder under the force of gravity, and permits the hot gaseous combustion products to exit from the opposite end, the gases raised by their own natural buoyancy, exiting through exhaust flue 92. However, it will be further understood by one of ordinary skill in the art that the angle of disposition may not be too great, so as to avoid the creation of high velocity exhaust gas streams flowing in a turbulent fashion under their own natural buoyancies, thereby causing the combustion flames to flicker. It will be understood that it is one intention of the present invention to provide a hydrocarbon generator that has combustion flames that do not flicker, nor vary in any other way, during impingement of carbon black upon the interior surface of impingement cylinders, for it has been discovered that variations in flames caused by turbulent air flow create an inconsistent and inferior carbon black product.

Referring now to FIG. 4, exhaust flue 92 is attached to chimney structure 94. It will be understood that the first and second ends of the combustion burners will have identical plenums and gas and air feed tubes attached to them and that each bank of two combustion burners will be connected to a single plenum and that each cylinder assembly 18 has four cylinders, where a single recovery unit 12 has two cylinder assemblies, hence having 8 cylinders and 4 burners. As shown in FIG. 4, plenums 86 and 100 are supplied gas by gas supply lines 84 and 98, respectively, each receiving gas from gas line 96, and are supplied with oxygen containing air by lines 88 and 104, respectively, each supplied by air line 102.

Referring now to FIGS. 5a and 5b, cylinder assembly 18 is shown in greater detail, with the various plenums and gas burners removed. In particular, FIG. 5a shows cylinder assembly 18 attached to plenums 70 and 72 so that cooling air may move through plenum 70 as shown by arrow 130 and exit plenum 72 as shown by arrow 132. Cylinders 32, 34, 36, and 38 are driven in a circular fashion by chain 42 which contacts each cylinder by gears 122, 120, 118, and 116, respectively, which chain is tensioned across these gears by idler gears 110, 112, 114, 124, and 126. Chain 42 is driven by gear 140, which in turn is driven by motor unit 46 through chain 142.

As seen in FIG. 5b, plenums 70 and 72 may be detached from and suspended above cylinder assembly 18 to allow cylinder assembly 18 to be removed from a recovery unit 12 in a sliding manner as shown by arrow 150 and as shown in FIG. 1. It will be understood that a cylinder assembly may be completely removed from a recovery unit 12, or may be only partially extended therefrom, and in either case such removal allows ease of maintenance with regard to the drive mechanism, cylinder support means, and carbon black recovery means.

Turning now to FIG. 6, cylinder 32 is shown in phantom and burner assembly 90 is shown passing through its interior. Burner assembly 90 is attached to its adjacent burner tube located in cylinder 34 (not shown) by plate 152 which plate is located between the end of assembly 90 and plenum 54. Plenum 54 is shown with gas feed line 60 and air feed line 64, and it will be understood that gas feed line 60 connects to gas nipple 154 which is concentrically located within air duct 156. It will be understood that burner assembly 90 attaches to air duct 156 so that oxygen containing air may be driven through burner assembly 90, and that gas tube 158 is concentrically located within burner assembly 90, and the gas tube attaches to gas nipple 154 so that the oxygen containing air and gas are properly mixed to allow combustion at jet 160. It will be understood of one of ordinary skill in the art that combustion jets 160 are removable and replaceable with different jets so as to produce a variety of different carbon black products. And yet further, it will be understood that the burner assembly 90 as shown in FIG. 6 provides an advantageous means of producing a gas flame at jet 160 that burns without flicker or other turbulent effects due to the laminer flow of oxygen containing air through burner assembly 90.

Referring now to FIGS. 7a and 7b certain generalized aspects of the present invention are shown, where a carbon black impingement cylinder as described above may be mounted within a manifold so that ambient air may be drawn across the exterior surface of a cylinder so as to regulate and control the cylinder's temperature in an improved manner. In particular, as shown in FIG. 7a, a square shaped manifold 300 is employed to enclose a cylinder 228. It will be understood that a manifold of the type shown in FIG. 7a is suitable for use in the device shown in FIGS. 1-6. Manifold 300 has air inlet 302 and air exhaust 304, where both inlet and exhaust may be controlled by a valve or throttle means (not shown) so as to regulate the flow of ambient air through manifold 300 and thereby regulate the temperature of cylinder 228. The flow of ambient air through manifold 300 is shown by arrows 306. It will be understood that jets 254 are located within cylinder 228 in a configuration similar to that shown in FIG. 6.

As shown in FIG. 7b, manifold 310 may be of circular cross section and have air inlet 312 and air exhaust 314, with both inlet and exhaust having a valve or throttle means (not shown) to control the flow of ambient air through manifold 310, and thereby control and moderate the temperature of cylinder 228. Similarly, the flow of ambient air through manifold 310 is shown by arrows 316. It will be understood that manifold 300 and 310 are particularly useful when it is desired to form a carbon black product that requires cylinder 228 to be particularly cool during production.

Referring now to FIGS. 8a and 8b, cylinder 228 is mounted on bearings 320 and 322, which in turn are mounted on bearing stands 328 and 334, respectively, and the cylinder is prohibited from sliding in the horizontal plane by thrust bearing 324. Cylinder 228 is mounted on shafts 330 and 332. In particular, cylinder 228 is mounted on shaft 330 by spokes 350, 352, 354, and 356. Likewise, shaft 332 is secured to cylinder 228 by spokes 380, 382, 384, and 386 (not shown). Cylinder 228 is supported by bearings 320 and 322 by shafts 330 and 332, with the bearings contacting each shaft at the shaft's ends most distant from cylinder 228. In particular, shaft 330 contacts bearings 320 and 326, and shaft 332 contacts bearing 322 and a second bearing (not shown). Shafts 330 and 332 each have a plurality of louvers or cutouts 340 between cylinder 228 and the portion of each shaft that contacts its respective bearing support. Cutouts 340 serve to allow air to circulate through shafts 330 and 332 to prohibit overheating of the external ends of each shaft, and the consequent overheating of their respective bearing supports.

In general, the circumference of each shaft has about twelve cutouts 340 and a corresponding number of remaining metal fingers 342 which serve to connect the external portion shafts 330 and 332 to their respective inner portions to which the spokes and cylinder 228 connect. It will be understood that the remaining portions 342 are of sufficient strength to support the weight of cylinder 228, and are of sufficient surface area to allow dissipation of the heat from cylinder 228, the support spokes, and the internal portions of shafts 330 and 332 by free or forced convection of air therethrough so that the bearing supports are not subjected to excess heat.

As seen in FIG. 8a, air manifold 250 extends through shaft 330, cylinder 228 and shaft 332 so as to be connected to air and gas supplies at a point external to the rotating apparatus. Manifold 250 has mounted on its portion located in the interior of cylinder 228 chain 270 which serves to dislocate carbon black which has been deposited on the interior surface of the cylinder, and has jets 254 located within cylinder 228 to deposit carbon black on the cylinder's interior surface by the combustion process contemplated by the present invention. It will be understood that carbon black dislodged from the interior surface of cylinder 228 by chain 270 moves under the influence of gravity towards the lowermost end of cylinder 228, as that cylinder is inclined at an angle of between about 5° and 20°, but may be inclined at an angle of less than 5°, and in a preferred embodiment is inclined at a angle of about 5°.

Referring to FIG. 8b, the carbon black dislodged by chain 270 may exit cylinder 228 by passing between spokes 350, 352, 354, and 356 to be received in a container (not shown) or to fall on a conveyor belt (not shown), which conveyor belt moves the loose carbon black material to a remote location, and deposits the carbon black product in a container (not shown).

Figure 9A:
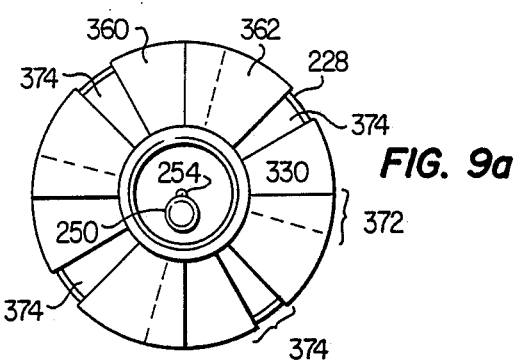
FIG. 9a is an end view of one aspect of the present invention.
Figure 9B:
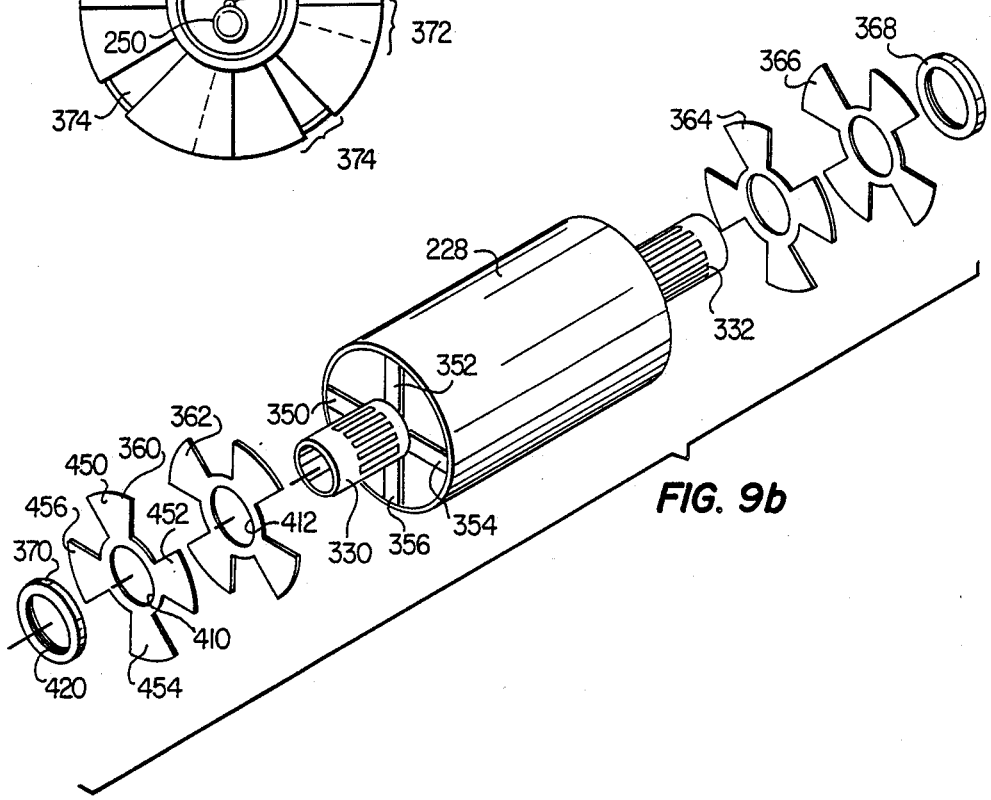
FIG. 9b is an exploded view of one aspect of the present invention.

Referring now to FIGS. 9a and 9b, in an alternative embodiment, the shaft and cylinder configuration of 8a and 8b may also include a valve or throttle mechanism to control the passage of ambient air into the interior volume of the cylinder combustion chamber and the passage of flue gases therefrom. Such a valve or throttle mechanism is useful for controlling the internal temperature of cylinder 228 and also useful for controlling the velocity of air flowing through the cylinder during the combustion process to avoid disrupting the carbon black deposition process by causing the flames emitting from jets 254 from flickering or otherwise being disturbed. In particular, FIG. 9b shows louvers 360 and 362 having internal cutouts 410 and 412, respectively, sized to engage with the outside diameter of shaft 330 proximate to spokes 350, 352, 354, and 356. Louvers 360 and 362 are retained on the interior end of shaft 330 proximate to the spokes and cylinder 228 by retaining ring 370, which ring has an internal diameter 420 sized to engage with the external diameter of shaft 330.

Similarly, shaft 332 has mounted about its interior external diameter louvers 364 and 366 retained in a position proximate to spokes 380, 382, 384, and 386 (not shown) by retaining ring 368. Louver 360 has baffles 450, 452, 454, and 456, and similarly louvers 362, 364, and 366 have identical baffles. It is the position of these baffles on the various louvers that determines the volume flow of air into cylinder 228 and volume flow of flue gases therefrom.

As shown in FIG. 9a, louvers 360 and 362 are affixed to shaft 330 in a staggered fashion and retained against cylinder 228 by retaining ring 370. In particular, louvers 360 and 362 overlap at point 372 to form four vents, as characterized by opening 374. These vents or openings into cylinder 228 serve to regulate the flow of cool air into the cylinder and to regulate the flow of hot combustion gases therefrom. It will be understood that retaining ring 370 may be loosened so as to permit the aperture of opening 374 to be either increased or decreased depending on the needs of the user. It will be further understood that the carbon black product dislodged from the interior surface of cylinder 228 by chain 270 can freely flow out of cylinder 228 through opening 374.

Figure 10:
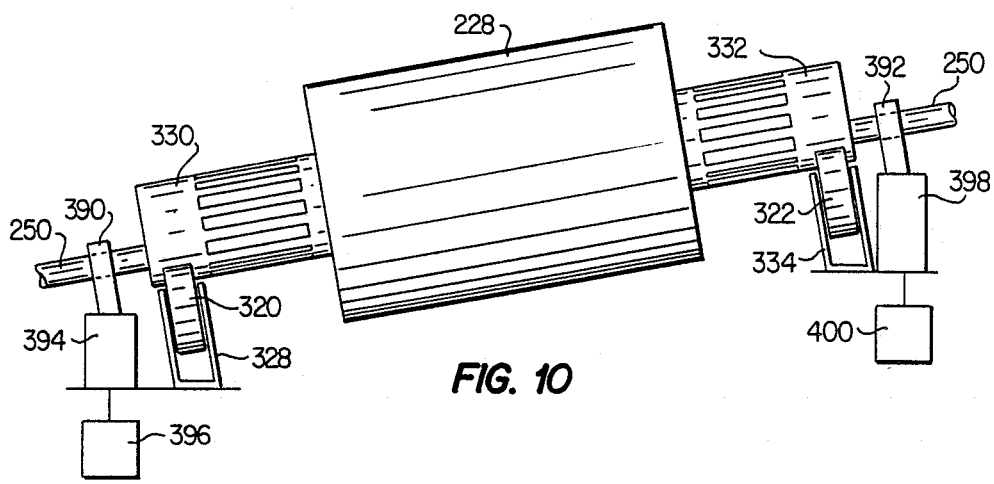
FIG. 10 is a side view of one aspect of the present invention.

Referring now to FIG. 10, air manifold 250 is mounted on support yokes 390 and 392 located proximate to the external ends of shafts 330 and 332. Yokes 390 and 392 are connected to servomechanisms 394 and 398, respectively, which servomechanisms serve to either raise or lower the height of manifold 250 with respect to the upper interior surface of cylinder 228. Servomechanisms 394 and 398 are in turn controlled by controlling units 396 and 400 which are either user operated or connected to an automatic sensor (not shown) which serves to trigger controllers 396 and 400 when the ambient air temperature or relative humidity changes, thereby requiring that air manifold 250 be either raised or lowered with respect to the upper interior surface of cylinder 228 to assure that a uniform carbon black material is efficiently produced without contamination by carbon black particles of differing unwanted or undesired sizes.

Although preferred and certain alternative embodiments of the invention have been described in the foregoing description and illustrated in the accompanying drawings, it will be understood that the invention is not limited to the embodiments disclosed, but is capable of numerous rearrangements, modifications, and substitution of parts and elements without departing from the spirit of the invention. The present invention is therefore intended to encompass such rearrangements, modifications, and substitution of parts and elements as fall within the scope of the invention.

I claim:

1. A cylinder assembly useful in a carbon black recovery unit, wherein said cylinder assembly comprises at least one rotatable metal cylinder having first and second ends, and further comprises first and second elongate shafts mounted at said first and second ends of the cylinder, respectively, by spokes, each of the elongate shafts extending from a proximate end mounted to the cylinder to a distant end away from the cylinder where said and second shafts have a plurality of elongate louvers located so as to dissipate heat generated during operation by free or forced convection of air through said louvers to cool the distant ends and an adjacent portion of said first and second shafts, and where said cooled portion of said shafts contact a cylinder support means.

2. The cylinder assembly of claim 1 wherein said cylinder support means comprise rotatable bearings.

3. The cylinder assembly of claim 1 further comprising a burner assembly, a volume formed within said cylinder, and a passageway of sufficient diameter located in said first and second elongate shafts, said passageways are sized to receive and contain the burner assembly, and allow the burner assembly to be located within the interior volume of said cylinder.

4. A cylinder assembly useful in a carbon black recovery unit comprising a rotatable metal cylinder and first and second throttle means attached to said cylinder, said cylinder having first and second ends and an internal volume, the first throttle means mounted over the first end of the cylinder and the second throttle means mounted over the second end of the cylinder whereby the volume flow of air into the internal volume of said cylinder and the volume flow of flue gases therefrom may be regulated, said first and second throttle means comprising at least a single louver having a series of baffles so as to be interposed over at least a single end of said cylinder to regulate the volume flow both into and out of said internal volume.

5. An apparatus for recovering carbon from carbon containing gas, said apparatus comprising a cabinet;
   a cylinder assembly disposed within said cabinet, said cylinder assembly comprising at least one rotatable metal cylinder;
   a burner assembly at least partially disposed within said cylinder, said burner assembly combining a carbon containing gas with a sufficient amount of an oxygen containing gas to support combustion without oxidizing all of the carbon contained in the carbon containing gas, and for combusting said carbon containing gas and said oxygen containing gas in such manner that the flame produced thereby is directed against the interior surface of said rotatable cylinder;
   a cylinder drive assembly imparting rotational motion to said cylinder and controlling the rate of rotation of said cylinder within a desired range;
   means for controlling the temperature of said cylinder within a desired range while said cylinder is being rotated and while said carbon containing gas and said oxygen containing gas are being combusted therein;

means for recovering the carbon deposited on the interior surface of said cylinder from said cylinder;

said cylinder having first and second ends and further comprising first and second elongate shafts, each elongate shaft having first and second ends, the first end of the first and second elongate shafts mounted to said first and second ends of said cylinder, respectively, by spokes, where said first and second shafts have a plurality of elongate louvers located therein so as to dissipate heat generated during operation by free or forced convection of air through said louvers to cool the second ends of said first and second shafts most distant from said cylinder, where said second ends of said shafts contact cylinder support means comprising rotatable bearings.

6. An apparatus for recovering carbon from a carbon containing gas, said apparatus comprising a cabinet;

a cylinder assembly disposed within said cabinet, said cylinder assembly comprising at least one rotatable metal cylinder having first and second ends;

a burner assembly comprising a burner tube at least partially disposed within said cylinder, said burner assembly combining a carbon containing gas with a sufficient amount of an oxygen containing gas, to support combustion without oxidizing all of the carbon contained in the carbon containing gas, and for combusting said carbon containing gas and said oxygen containing gas in such manner that the flame produced thereby is directed against the interior surface of said rotatable cylinder;

a cylinder drive assembly imparting rotational motion to said cylinder and to control the rate of rotation of said cylinder within a desired range;

means for controlling the temperature of said cylinder within a desired range while said cylinder is being rotated and while said carbon containing gas and said oxygen containing gas are being combusted therein;

means for recovering the carbon deposited on the interior surface of said cylinder from said cylinder;

first and second throttle means mounted to the first and second end of the cylinder, respectively, an internal volume, whereby the volume flow of air into the internal volume of said cylinder and the volume flow of flue gases therefrom may be regulated, each throttle means comprising at least a single louver having a series of baffles so as to be interposed over an end of said cylinder to regulate the volume flow both into and out of said cylinder internal volume.

7. The apparatus of claim 6 wherein said burner assembly further comprises means to both raise and lower said burner tube within the internal volume of said cylinder assembly.

* * * * *